W. T. BELL AND F. J. BRETHERTON.
STEERING MECHANISM.
APPLICATION FILED AUG. 9, 1920.

1,361,668.

Patented Dec. 7, 1920.

Inventors
William T. Bell
Francis J. Bretherton

UNITED STATES PATENT OFFICE.

WILLIAM THOMAS BELL AND FRANCIS JAMES BRETHERTON, OF LINCOLN, ENGLAND.

STEERING MECHANISM.

1,361,668.   Specification of Letters Patent.   Patented Dec. 7, 1920.

Application filed August 9, 1920. Serial No. 402,410.

*To all whom it may concern:*

Be it known that we, WILLIAM THOMAS BELL and FRANCIS JAMES BRETHERTON, subjects of the King of Great Britain, residing at Lincoln, England, have invented certain new and useful Improvements in Steering Mechanism, of which the following is a specification.

This invention relates to the steering mechanism of that class of road motor vehicles in which the front or steering wheels are on a single axle and are turned about a bolt or perch and consists of an adaptation of the worm and quadrant steerage with the intervention of springs to take road shocks due to any horizontal concussion taking place on the road wheels. In other words the ring acts as a cushion between the fore-carriage and the worm and worm wheel or quadrant.

The invention will be clearly understood from the following description aided by the annexed drawings in which—

Figure 1:
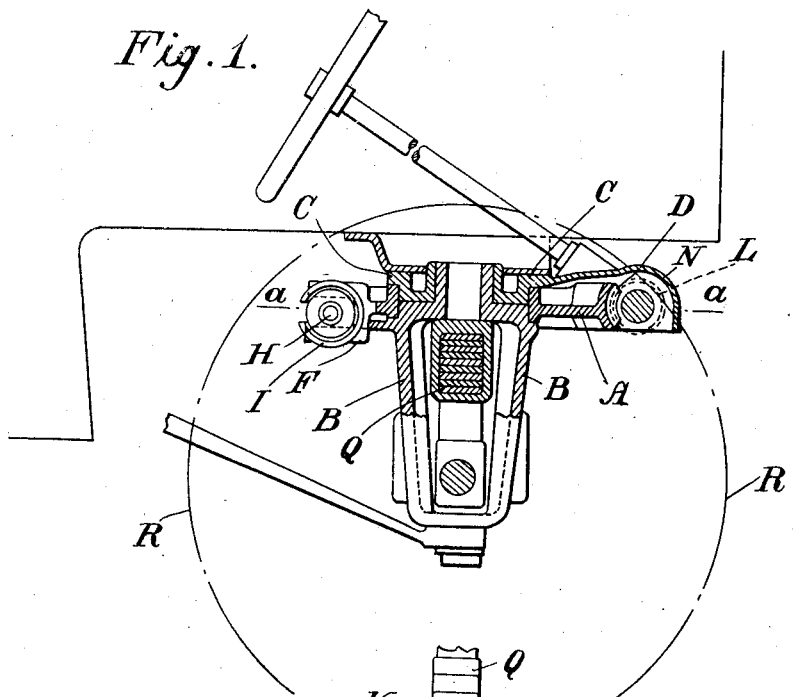

Figure 1 is a part sectional elevation of suitable appliances.

Figure 2:
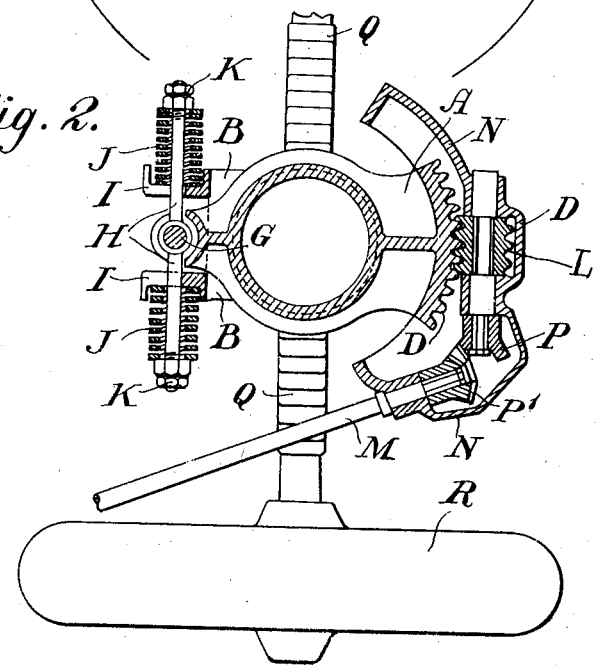

Fig. 2 a section on the line *a—a* of Fig. 1.

In simple form and as is shown on the annexed drawings we construct the quadrant A to move about a master pin B and yet be held between the master pin B and saddle bracket C, and on the side of quadrant A opposite to the worm D we construct a lug F having an aperture for receiving a vertical pin G engaging an aperture in a member H having arms projecting to opposite sides of the pin. On the master pin we form two recessed lugs I, I positioned on each side of the vertical pin G, said recesses engaging the arms of the member H. At each side of member H and outside of the lugs I, I we position helical springs J, J which are held on the arms by means of nuts K, K and washers so that the quadrant A is held between the two springs J, J and whereby any shock or concussion encountered by the road wheels will be transmitted through the master pin B to the springs J, J and not communicated in any serious degree to the quadrant A and worm L, thus preventing any strains on its steering post M and its connections. The gearing between the worm L and the quadrant is preferably irreversible so that the shock on the road wheels is yieldingly resisted by the springs J, J.

The saddle bracket C is secured to the vehicle frame and is provided with an extension which carries the worm L beveled gears P, P' and springs post M. The letter Q denotes the ordinary springs, and R one of the road wheels mounted on the front axle.

It is apparent from the above description that shocks which come upon the road wheels are yieldingly resisted by the springs J, J, thus preventing the transmission of the same directly to the worm gearing and steering device and thereby eliminating the consequent danger of injury or breakage of the mechanism.

What we do claim as our invention and desire to secure by Letters Patent is:—

In steering mechanism for vehicles having a front axle turnable about a vertical axis, a master pin movable with said axle, a bracket secured to the vehicle frame, a tooth quadrant having a hub rotatably supported with relation to the master pin and bracket and provided with an apertured lug, a pin passing through said aperture, a member pivotally mounted on said pin having arms projecting in opposite directions, recessed lugs extending from the master pin and engaging said arms, compression springs engaging said arms at one end and the recessed lugs at the other end, a worm meshing with the quadrant, and means for actuating said worm from the steering post of the vehicle whereby shocks encountered by the road wheels of the front axle are yieldingly resisted by said springs.

In testimony whereof we have hereunto set our hands in presence of two subscribing witnesses.

WILLIAM THOMAS BELL.
FRANCIS JAMES BRETHERTON.

Witnesses:
FREDERICK GARLON,
ERNEST OCTAVIUS GEORGE.